United States Patent
Bailey, Jr.

(10) Patent No.: US 8,924,296 B2
(45) Date of Patent: Dec. 30, 2014

(54) DYNAMIC PAIRING SYSTEM FOR SECURING A TRUSTED COMMUNICATION CHANNEL

(75) Inventor: Samuel A. Bailey, Jr., Boca Raton, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 89 days.

(21) Appl. No.: 12/820,186

(22) Filed: Jun. 22, 2010

(65) Prior Publication Data

US 2011/0313925 A1    Dec. 22, 2011

(51) Int. Cl.
*G06Q 40/00* (2012.01)

(52) U.S. Cl.
USPC .......................................................... 705/44

(58) Field of Classification Search
USPC .................................................... 705/35–45
See application file for complete search history.

(56) References Cited

U.S. PATENT DOCUMENTS

| | | | |
|---|---|---|---|
| 4,796,025 A | 1/1989 | Farley et al. | |
| 5,053,956 A | 10/1991 | Donald et al. | |
| 5,784,566 A | 7/1998 | Viavant et al. | 395/200.59 |
| 6,088,450 A | 7/2000 | Davis et al. | |
| 6,321,338 B1 | 11/2001 | Porras et al. | |
| 6,330,546 B1 * | 12/2001 | Gopinathan et al. | 705/35 |
| 6,484,182 B1 | 11/2002 | Dunphy et al. | |
| 6,530,024 B1 | 3/2003 | Proctor | |
| 6,590,580 B2 | 7/2003 | Horikawa et al. | |
| 6,611,863 B1 | 8/2003 | Banginwar | |
| 6,681,249 B2 | 1/2004 | Christensen et al. | |
| 6,744,780 B1 | 6/2004 | Gu et al. | |
| 6,961,858 B2 | 11/2005 | Fransdonk | |
| 6,965,294 B1 | 11/2005 | Elliott et al. | |
| 7,020,635 B2 | 3/2006 | Hamilton et al. | |
| 7,058,968 B2 | 6/2006 | Rowland et al. | |
| 7,080,049 B2 | 7/2006 | Truitt et al. | |
| 7,090,128 B2 | 8/2006 | Farley et al. | |
| 7,107,462 B2 | 9/2006 | Fransdonk | |

(Continued)

FOREIGN PATENT DOCUMENTS

JP    2004078539 A    3/2004

OTHER PUBLICATIONS

Selim Aissi et al., "Security for Mobile Networks and Platforms", Artech House Publishers (2006), 329 pages.

(Continued)

*Primary Examiner* — Robert Niquette
*Assistant Examiner* — Jennifer Liu
(74) *Attorney, Agent, or Firm* — Fitzpatrick, Cella, Harper & Scinto

(57) ABSTRACT

A system for securing a trusted communications channel for a mobile financial transaction is provided by receiving, from a user via an external terminal, a request for an access control entitlement to complete a financial transaction. A total risk level associated with the financial transaction is computed. A required trust score is determined based on the total risk level. User identification data associated with the user is received from one or more data sources. The user identification data is validated. A user trust score associated with the user is computed based on the validated identification data. The user trust score is compared to the required trust score. The access control entitlement is transmitted to the user via the external terminal if the user trust score is greater than or equal to the required trust score.

15 Claims, 7 Drawing Sheets

(56) References Cited

U.S. PATENT DOCUMENTS

| | | | |
|---|---|---|---|
| 7,150,045 B2 | 12/2006 | Koelle et al. | |
| 7,152,242 B2 | 12/2006 | Douglas | |
| 7,174,462 B2 | 2/2007 | Pering et al. | |
| 7,260,844 B1 | 8/2007 | Tidwell et al. | |
| 7,305,709 B1 | 12/2007 | Lymer et al. | |
| 7,565,693 B2 | 7/2009 | Shin et al. | |
| 7,587,502 B2 | 9/2009 | Crawford et al. | |
| 7,660,795 B2* | 2/2010 | Barrett et al. | 707/783 |
| 7,711,586 B2 | 5/2010 | Aggarwal et al. | |
| 7,835,721 B2 | 11/2010 | Tuulos et al. | |
| 7,895,649 B1 | 2/2011 | Brook et al. | |
| 7,921,205 B2 | 4/2011 | Shen et al. | |
| 7,937,353 B2 | 5/2011 | Bernoth et al. | |
| 8,001,054 B1* | 8/2011 | Peart et al. | 705/75 |
| 8,074,282 B1 | 12/2011 | Lymer et al. | |
| 8,087,085 B2 | 12/2011 | Hu et al. | |
| 8,117,458 B2 | 2/2012 | Osborn, III et al. | |
| 8,146,160 B2 | 3/2012 | Orr et al. | |
| 8,406,119 B2 | 3/2013 | Taylor et al. | |
| 2002/0129145 A1 | 9/2002 | Chow | |
| 2003/0110392 A1 | 6/2003 | Aucsmith et al. | |
| 2003/0145226 A1 | 7/2003 | Bruton, III et al. | |
| 2004/0015719 A1 | 1/2004 | Lee et al. | |
| 2004/0030927 A1 | 2/2004 | Zuk | |
| 2004/0049698 A1 | 3/2004 | Ott et al. | |
| 2004/0187034 A1 | 9/2004 | Tamura et al. | |
| 2005/0010768 A1 | 1/2005 | Light et al. | |
| 2005/0091527 A1 | 4/2005 | Swander et al. | 713/201 |
| 2005/0125360 A1* | 6/2005 | Tidwell et al. | 705/65 |
| 2005/0182969 A1 | 8/2005 | Ginter et al. | |
| 2005/0201561 A1 | 9/2005 | Komano et al. | |
| 2006/0085839 A1 | 4/2006 | Brandt et al. | 726/2 |
| 2006/0090198 A1 | 4/2006 | Aaron | 726/6 |
| 2006/0161435 A1* | 7/2006 | Atef et al. | 704/246 |
| 2006/0200427 A1 | 9/2006 | Morrison et al. | 705/67 |
| 2006/0200666 A1 | 9/2006 | Bailey, Jr. | 713/168 |
| 2006/0225132 A1 | 10/2006 | Swift et al. | 726/11 |
| 2006/0276173 A1 | 12/2006 | Srey et al. | |
| 2006/0291447 A1 | 12/2006 | Siliquini et al. | |
| 2007/0016955 A1 | 1/2007 | Goldberg et al. | 726/25 |
| 2007/0036314 A1 | 2/2007 | Kloberdans et al. | |
| 2007/0143832 A1 | 6/2007 | Perrella et al. | 726/5 |
| 2007/0234412 A1 | 10/2007 | Smith et al. | 726/11 |
| 2007/0250709 A1 | 10/2007 | Bailey, Jr. | 713/168 |
| 2008/0086759 A1* | 4/2008 | Colson | 726/2 |
| 2008/0098464 A1 | 4/2008 | Mizrah | |
| 2008/0120707 A1 | 5/2008 | Ramia | |
| 2008/0262990 A1 | 10/2008 | Kapoor et al. | |
| 2008/0270579 A1 | 10/2008 | Herz et al. | 709/219 |
| 2008/0307487 A1 | 12/2008 | Choyi et al. | |
| 2009/0125977 A1 | 5/2009 | Chander et al. | |
| 2009/0158425 A1 | 6/2009 | Chan et al. | 726/21 |
| 2009/0165125 A1* | 6/2009 | Brown et al. | 726/21 |
| 2009/0216910 A1 | 8/2009 | Duchesneau | |
| 2009/0222907 A1 | 9/2009 | Guichard | |
| 2009/0271844 A1 | 10/2009 | Zhang et al. | 726/2 |
| 2009/0300716 A1 | 12/2009 | Ahn | 726/1 |
| 2009/0328219 A1 | 12/2009 | Narayanaswamy | |
| 2010/0010874 A1* | 1/2010 | Howard et al. | 705/10 |
| 2010/0082513 A1 | 4/2010 | Liu | |
| 2010/0251388 A1 | 9/2010 | Dorfman | |
| 2010/0275010 A1 | 10/2010 | Ghirardi | |
| 2010/0294927 A1 | 11/2010 | Nelson et al. | |

OTHER PUBLICATIONS

Zhigun Chen, "Java Card Technology for Smart Cards: Architecture and Programmers Guide", Prentice Hall (2000), pp. 57-63.

Clayton M. Christensen and Michael E. Raynor, "The Innovators Solution: Creating and Sustaining Successful Growth" Harvard Business Press (2003), pp. 31-71.

Edward T. Dowling, "Mathematical Methods for Business and Economics", McGraw-Hill (2009), pp. 89-127 and 177-196.

Robert Gibbons, "Game Theory for Applied Economists", Princeton University Press (1992), pp. 29-48 and 173-255.

Charles W. L. Hill and Gareth R. Jones, "Strategic Management Theory: An Integrated Approach", South-Western College Pub, 9th edition (2009), pp. 208-241.

Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.

Ronald L. Krutz and Russell Dean Vines, "The CISSP Prep Guide, Mastering the Ten Domains of Computer Security", Wiley (2001), pp. 183-213.

Peter Morris, "Introduction to Game Theory", Springer Verlag New York, Inc. (1994), pp. 65-97.

Winn Schwartau, "Time Based Security", Interpact Press (1999), pp. 33-36, 65-74, and 121-125.

Shreeraj Shah, "Hacking Web Services", Charles River Media (2006), pp. 171-221, 271-298.

Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.

Colin English et al., "Dynamic Trust Models for Ubiquitous Computing Environments", University of Strathclyde, Glasgow, Scotland, Department of Computer and Information Sciences (2002).

Graham Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;segmentUtilities.

Peng Ning and Sushil Jajodia, "Intrusion Detection Techniques", http://discovery.csc.ncsu.edu/Courses/csc774-S03/IDTechniques.pdf (last visited Sep. 24, 2010).

Brian Wotring, "Host Integrity Monitoring: Best Practices for Deployment" (Mar. 31, 2004), http://www.symantec.com/connect/articles/host-integrity-monitoring-best-practices-deployment.

* cited by examiner

DYNAMIC PAIRING SYSTEM FOR SECURING A TRUSTED COMMUNICATION CHANNEL

BACKGROUND OF THE INVENTION

1. Field of the Invention

The present invention generally relates to information security systems, and more particularly, to a dynamic pairing system for securing a trusted communication channel.

2. Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign country may require the mobile communication device to roam on a foreign or visiting mobile communication network, which has inherently different security countermeasures, attack scenarios, risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static, or remain within a tolerance related to nominal protection, once the system is deployed. A typical security system thus utilizes a particular set of security measures deployed until the security system is taken offline and either replaced or modified. In other words, if risks of the security system change, for example, due to an innovation, a new service, discovery of a design or product flaw, breach of a security measure by an attacker, etc., a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems that must constantly innovate to adapt to changing markets, services, and business models. Moreover, the static security measures of typical fortress security systems increase the ease with which internal and external attackers can circumvent less adaptive security measures. As payment and network systems adapt to next generation payment and communication, the attacks and exploits will also evolve into next generation criminal exploits. As higher communication speeds, multiple communication channels, and multiple communication protocols become more common for convergent services, attack scenarios and protection mechanisms will be represented by matrices as opposed to the linear singularity used in traditional systems to represent exposure.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for performing dynamic pairing to secure a trusted communication channel.

Trust mediator agents, which are associated with each network component, continuously detect changes or signatures in the security characteristics of each network component using sensors and feed the detected or signatures changes back to a trust mediator. The trust mediator uses the feedback from the trust mediator agents to determine whether and how to modify currently running security safeguards in order to maintain an appropriate level of security that considers the interdependency of each component and asset at risk. Modifications, if any, are communicated by the trust mediator to the appropriate network component via its associated trust mediator agent for implementation. The process is recursive and thus continuously adapts to changes in network security characteristics as they arise over time to strike a balance between the probability of loss and magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Managing system interdependency relating to security signature state assists in evaluating changes related to new exploits, products, services, or innovations to reduce time-to-market while managing the acceptable level of risk exposed to the business within nominal levels to maintain brand and financial equity.

Users' expectations regarding security measures are taken into account. Thus, if a particular security measure is too inconvenient for a user, the security measure is modified or reduced to a minimal level within limits that do not degrade nominal protection for the system. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure with an alternate method. The effect is to increase the propensity for user satisfaction and thus movement towards equilibrium of strategy and payoff for usage of the system based on time, location, and relevance, and results in more efficient risk models to increase market share for the business entity. Users are offered choices to increase their propensity of adoption and use of security methods, while mitigating the circumnavigation of security controls that puts merchants, financers, and financees at risk.

In one embodiment, a system for securing a trusted communications channel for a mobile financial transaction is provided by receiving, from a user via an external terminal, a request for an access control entitlement to complete a financial transaction. A total risk level associated with the financial transaction is computed. A required trust score is determined based on the total risk level. User identification data associated with the user is received from one or more data sources. The user identification data is validated. A user trust score associated with the user is computed based on the validated identification data. The user trust score is compared to the required trust score. The access control entitlement is transmitted to the user via the external terminal if the user trust score is greater than or equal to the required trust score.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

I. Overview

Figure 1:
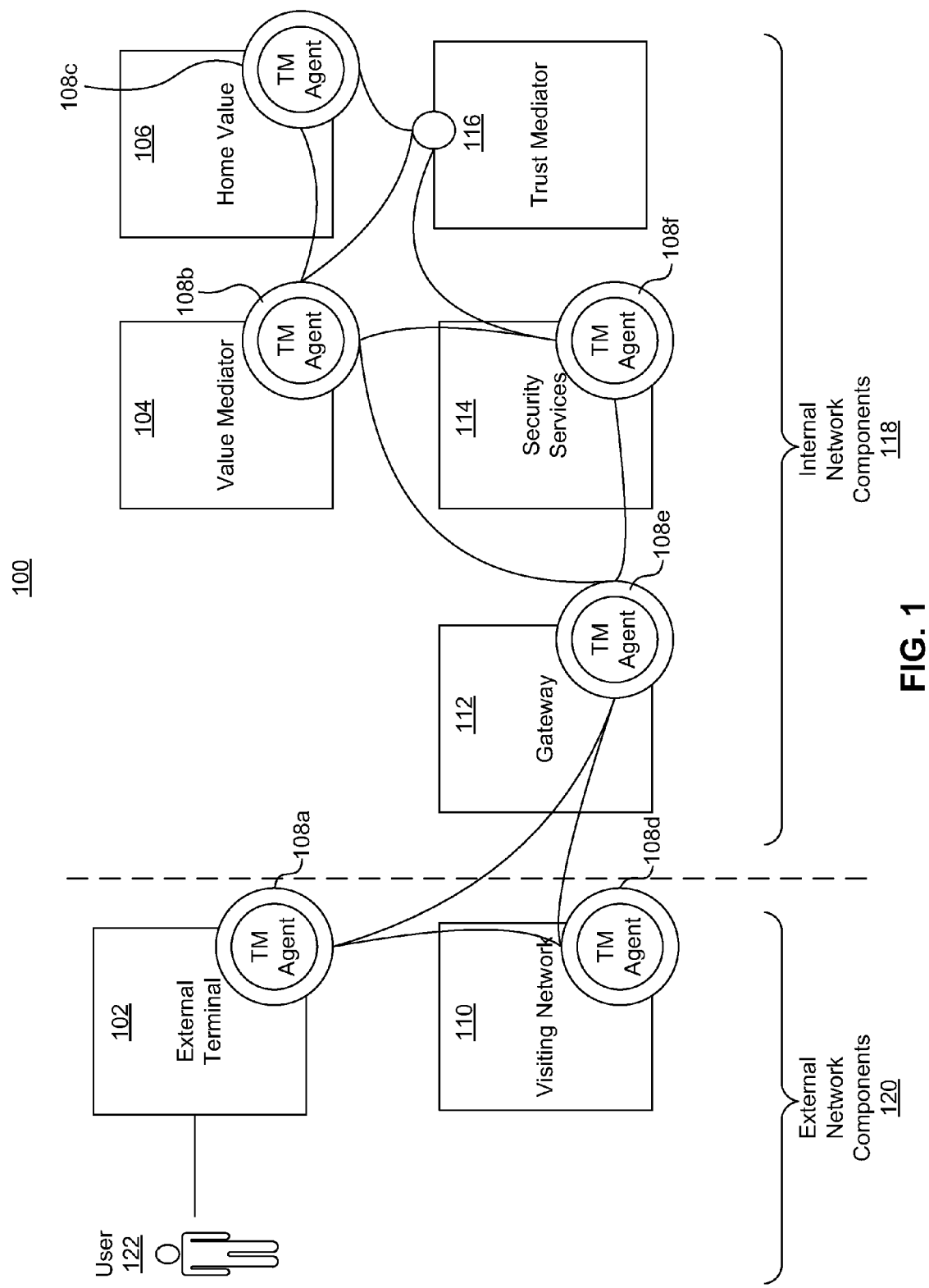
FIG. 1 is a diagram of an exemplary security system for adaptively securing mobile communication device transactions in accordance with an embodiment of the present invention.

The present invention is directed to a dynamic pairing system for securing a trusted communication channel, which is now described in more detail herein in terms of an example mobile financial payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, homeland security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, resource access, area access, entitlement access, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," "protection method," "protection mechanism," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like. Protection mechanism(s) may be one-dimensional, i.e., composed of a single protection mechanisms, or multi-dimensional, composed of multiple protection mechanisms.

The term "security-related information" is used herein to refer to any data or information that can be used by a trust mediator (described below) as the basis for making decisions as to implementations of security policy. For example, security-related information can include data relating to threats, exploits, attacks, safeguards, security measures, security safeguards, protection mechanisms, financial transaction-related data, non-financial-transaction-related data, mobile phone usage data, magnitude data, loss expectancy data, and the like.

The terms "transaction" and "financial transaction," and/or the plural forms of these terms, are used interchangeably throughout herein to refer to any transfer of value between two or more parties and/or communication network endpoints.

The terms "mobile transaction" and "mobile financial transaction," and/or the plural forms of these terms, are used interchangeably throughout herein to refer to any transfer of value between two or more parties effectuated via communication network endpoints, with at least one of the communication network endpoints being a mobile communication device.

II. System

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions a user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value (or valuation) module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus computes a quantitative value, and/or normalizes a qualitative value, for these assets to exchange the value across different value-bases. In addition, trust mediator 116 uses this quantitative value to compute risk magnitudes associated with these assets. For example, if the value of the transaction or commerce was an asset calculated by value mediator 104, then this computed value is input to trust mediator 116 to react by changing one or more protections, countermeasures, or policies related to the asset if thresholds associated with acceptable risk exposure are exceeded, or if user methods do not achieve an equilibrium between each player in the system, including stakeholders and criminals.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. The sensors can receive quantitative input, for example, from machines, electronics, etc. Alternatively, or in addition, the sensors can receive qualitative input from a human that initiates a topic of concern, such that data collection and normalization can be utilized for finite measurements, good will and intuitive measurements, and observations, which can then be validated with other qualitative or quantitative input. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

An exemplary external terminal 102, as well as exemplary processes for adapting security measures of a communication network based on dynamic feedback, collecting data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

III. Process

A. Overview

Figure 2:
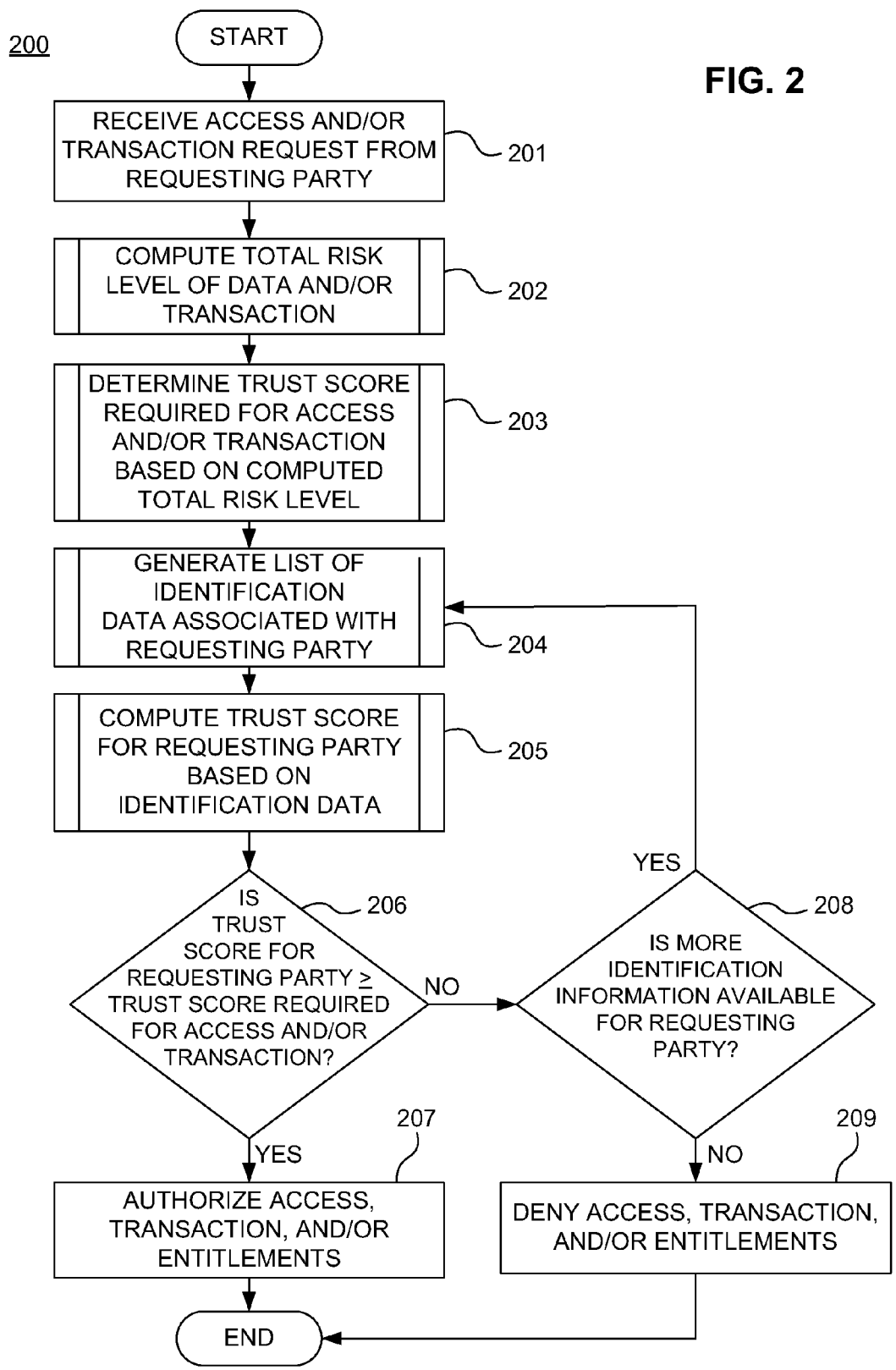
FIG. 2 is a flowchart illustrating an exemplary process for performing dynamic pairing of a user and an external terminal to secure a trusted communications channel for a mobile financial transaction.

FIG. 2 is a flowchart illustrating an exemplary process 200 for performing dynamic pairing of a user and an external terminal to secure a trusted communications channel for a mobile financial transaction. At block 201, trust mediator 116 receives via external terminal 102 a request from user 122 (which may also be referred to herein as a "requesting party") requesting access to stored data and/or requesting authorization of a mobile financial transaction. Example requests include a request to add, modify, and/or delete financial data stored in a particular database (not shown) within internal network components 118, a request to transfer funds between two financial accounts of the requesting party, a request to transfer funds between a financial account of the requesting party and a financial account of a third party (also sometimes referred to as a mobile-to-mobile payment), and the like. As will be understood by those skilled in the art, other such requests associated with financial data and/or financial transactions are contemplated and are within the scope of the embodiments described herein.

At block 202, trust mediator 116 computes (or is provided) a total risk level associated with the financial data to be accessed and/or the financial transaction to be authorized. According to one embodiment, trust mediator 116 computes the total risk level by (1) computing a magnitude associated with the financial data and/or financial transaction, (2) computing a probability that the financial data and/or financial transaction will be compromised, and (3) multiplying the magnitude by the probability. An exemplary process 202 for computing the total risk level associated with stored data and/or a financial transaction is discussed in further detail below in connection with FIG. 3.

At block 203, trust mediator 116 determines a trust score required to access the stored data and/or to authorize the financial transaction. In general, trust mediator 116 determines the required trust score by matching computed total risk levels to corresponding required trust scores stored in a table. An exemplary process 203 for determining the trust score required to access stored data and/or to authorize a transaction is discussed in further detail below in connection with FIG. 4.

At block 204, trust mediator 116 generates a list of accumulated identification data associated with the requesting party. In general, trust mediator 116 accumulates identification data associated with the requesting party by obtaining identification data from (1) the requesting party via external terminal 102, (2) internal and/or external sources, such as databases and social networking websites, and/or (3) one or more trusted third parties. An exemplary process 204 for generating a list of identification data associated with a requesting party is discussed in further detail below in connection with FIG. 5.

At block 205, trust mediator 116 computes a trust score for the requesting party based on the cumulative list of identification data associated with the requesting party. In general, trust mediator 116 computes the trust score for the requesting party by adding individual trust scores corresponding to each portion of identification data on the list generated at block 204. An exemplary process 205 for computing a trust score associated with a requesting party is discussed in further detail below in connection with FIG. 6.

At block 206, trust mediator 116 compares the trust score computed for the requesting party to the trust score required for access to the stored data and/or for authorization of the financial transaction. If trust mediator 116 determines that the trust score computed for the requesting party is greater than or equal to the trust score required for access to the stored data and/or for authorization of the financial transaction then, at block 207, trust mediator 116 grants access to the stored data and/or authorizes the financial transaction.

In one embodiment, granting access to the stored data and/or authorizing the financial transaction includes transmitting access control entitlements, such as encryption keys, etc., to the requesting party via external terminal 102. The entitlements may be pre-authorized to complete a predetermined number (i.e., one or more) of financial transactions or an unlimited number of financial transactions. In the event that the entitlements are pre-authorized for a predetermined number of financial transactions, once the requesting party has completed the predetermined number of financial transactions using system 100, the requesting party must repeat process 200 to obtain replacement entitlements and/or additional entitlements.

If trust mediator 116 determines that the trust score computed for the requesting party is less than the trust score required for access to the stored data and/or for authorization of the financial transaction then, at block 208, trust mediator 116 determines whether additional identification data is available for the requesting party. Trust mediator 116 can determine whether additional identification data is available by, for example, (1) determining whether any additional data sources, such as external databases, have become available or have been updated since the time that the list of identification data was generated at block 204, (2) querying the requesting party for additional identification data via external terminal 102, (3) querying one or more trusted third parties for confirmation or sponsorship of the identification data of the requesting party via additional external terminals, etc.

If trust mediator 116 determines that no additional identification data is available for the requesting party then, at block 209, trust mediator 116 denies access to the stored data and/or denies the financial transaction.

If trust mediator 116 determines that additional identification data is available for the requesting party then the process progresses to block 204 and trust mediator 116 generates an updated list of identification data associated with the requesting party. In this case, the process discussed above in connection with blocks 205 through 209 is repeated based on the updated list of identification data.

In one embodiment, trust mediator 116 may determine that the trust score computed for the requesting party is too low because it is less than the trust score required for authorization of a financial transaction with a third party, which may be, for example, a merchant at which the requesting party is attempting to complete a financial transaction, or a payee which the requesting is attempting to pay via a mobile-to-mobile financial transaction. In this case, trust mediator 116 sends a message to the third party (the merchant or the mobile-to-mobile payee) indicating the trust score computed for the requesting party and that it does not meet the required threshold, and asking the third party whether they wish to accept the transaction at their own risk, despite the insufficient trust score. If the third party accepts the transaction despite the insufficient trust score, then trust mediator 116 authorizes the transaction. In this way, a merchant or payee can complete a transaction with a payor who they trust but who, for certain reasons, is unable to achieve a trust score that passes a required threshold. This makes system 100 more flexible by providing an override feature.

B. Computing a Total Risk Level

Figure 3:
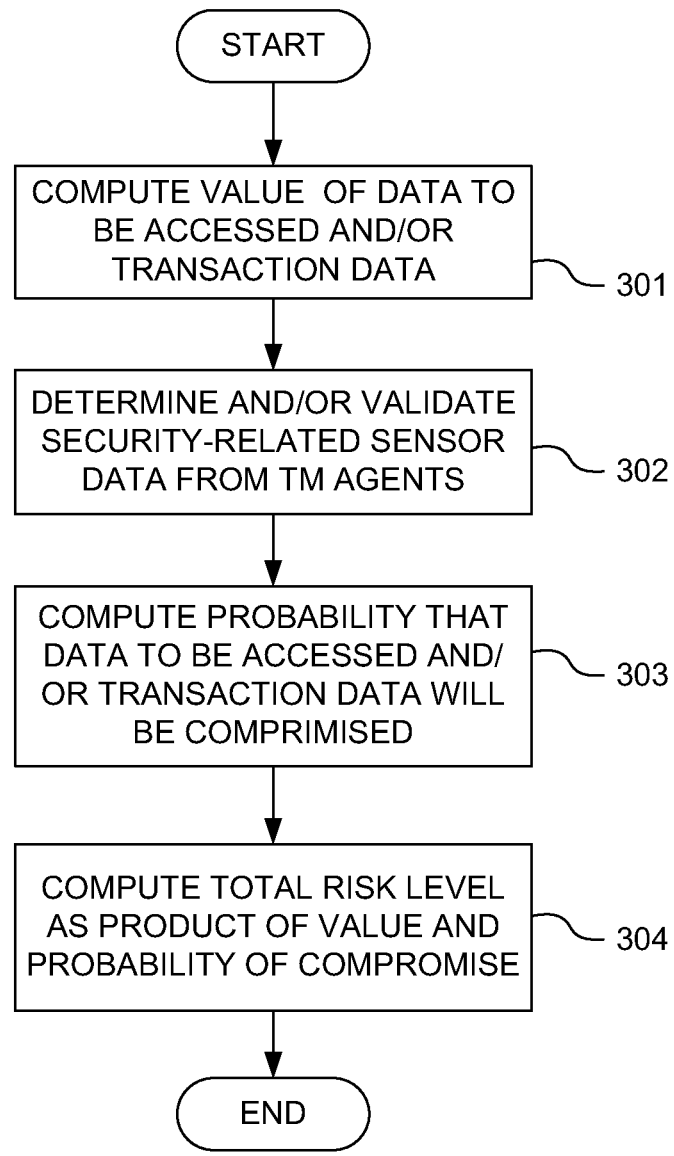
FIG. 3 is a flowchart illustrating an exemplary process for computing a total risk level associated with stored data and/or a financial transaction.

FIG. 3 is a flowchart illustrating an exemplary process 202 for computing a total risk level associated with stored data and/or a financial transaction. At block 301, trust mediator 116 computes a value (or risk magnitude) associated with the stored data to be accessed and/or the financial transaction to be authorized, including the data messages that are to be communicated between external terminal 102 and internal network components 118. The value is computed by using one or more valuation formulas, and in some cases the value may be equal to an amount of the financial transaction with which the data messages are associated. Alternatively, or in addition, the value may be computed based on an account balance of a financial account with which the data messages are associated.

At block 302, trust mediator 116 determines and/or validates a list of security-related data, including the currently implemented protection mechanisms, and the attacks, threats, exploits, etc., detected by sensors (not shown) distributed throughout system 100. Exemplary systems and methods for detecting security-related data using sensors are disclosed in U.S. patent application Ser. No. 12/640,183, entitled "Systems, Methods, and Computer Program Products for Collecting and Reporting Sensor Data in a Communication Network," filed Dec. 17, 2009.

At block 303, trust mediator 116 computes a probability that the security of the stored data to be accessed and/or the financial transaction to be authorized will become compromised based on the currently implemented protection mechanism(s) and the security-related attack information determined at block 302. For example, if the data is being protected with a particular encryption algorithm, then the probability of the security being compromised can be computed as being inversely proportional to the estimated time necessary to succeed in cracking the algorithm (e.g., by obtaining the key, or by using a brute force attack).

In another embodiment, the probability that the security of the data and/or transaction will be compromised is computed based on contextual data. For example, the probability of the security being compromised (e.g., by the transaction being fraudulent) may be greater if the request received at block 201 originated from a geographical location that is a predetermined distance away from the home town of record for user 122.

At block 304, trust mediator 116 computes a product of (1) the computed value of the stored data and/or financial transaction and (2) the computed probability that the security will be compromised to determine a total risk level associated with the stored data to be accessed and/or the financial transaction to be authorized.

C. Determining a Required Trust Score

Figure 4:
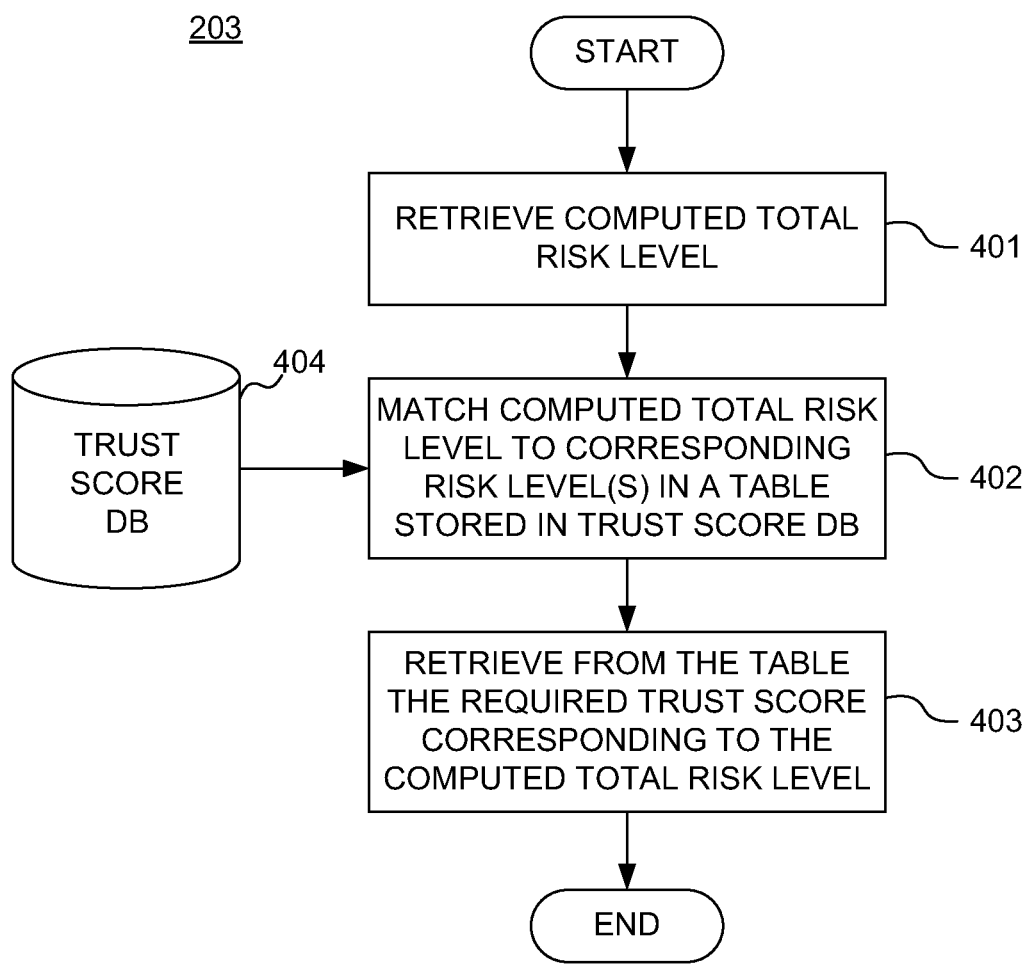
FIG. 4 is a flowchart illustrating an exemplary process for determining a trust score required to access stored data and/or to authorize a transaction.

FIG. 4 is a flowchart illustrating an exemplary process 203 for determining a trust score required to access stored data and/or to authorize a transaction. At block 401, trust mediator 116 retrieves the total risk level computed at block 304 (FIG. 3) associated with the stored data to be accessed and/or the financial transaction to be authorized.

A trust score database 404 stores a table that matches total risk levels to required trust scores, correspondingly. A required trust score is a minimal trust score that the requesting party must achieve to obtain access to the stored data and/or to obtain authorization of the financial transaction. In one embodiment, required trust score database 404 is constructed such that the required trust score is directly proportional to the total risk level. In another embodiment, required trust score database 404 is constructed such a that a single required trust score corresponds to a range of multiple total risk levels. At block 402, trust mediator 116 matches the computed total risk level to a corresponding risk level stored in required trust score database 404. At block 403, trust mediator 116 retrieves from required trust score database 404 a required trust score corresponding to the computed total risk level.

By requiring different trust scores from user 122 based on the total risk level associated with the request of user 122, system 100 balances the security of system 100 against propensity of users to use system 100. For example, user 122 may be required to achieve a trust score of 90 points for transactions of $1,000 to $9,999.99, and 75 points for transactions of $500 to $999.99. In this way, the burden of user 122 is commensurate with the risk associated with the transaction, which may increase the propensity of users to use system 100. Increased security is provided, while minimizing the user burden of using system 100 to complete financial transactions.

D. Generating a List of Identification Data of Requesting Party

Figure 5:
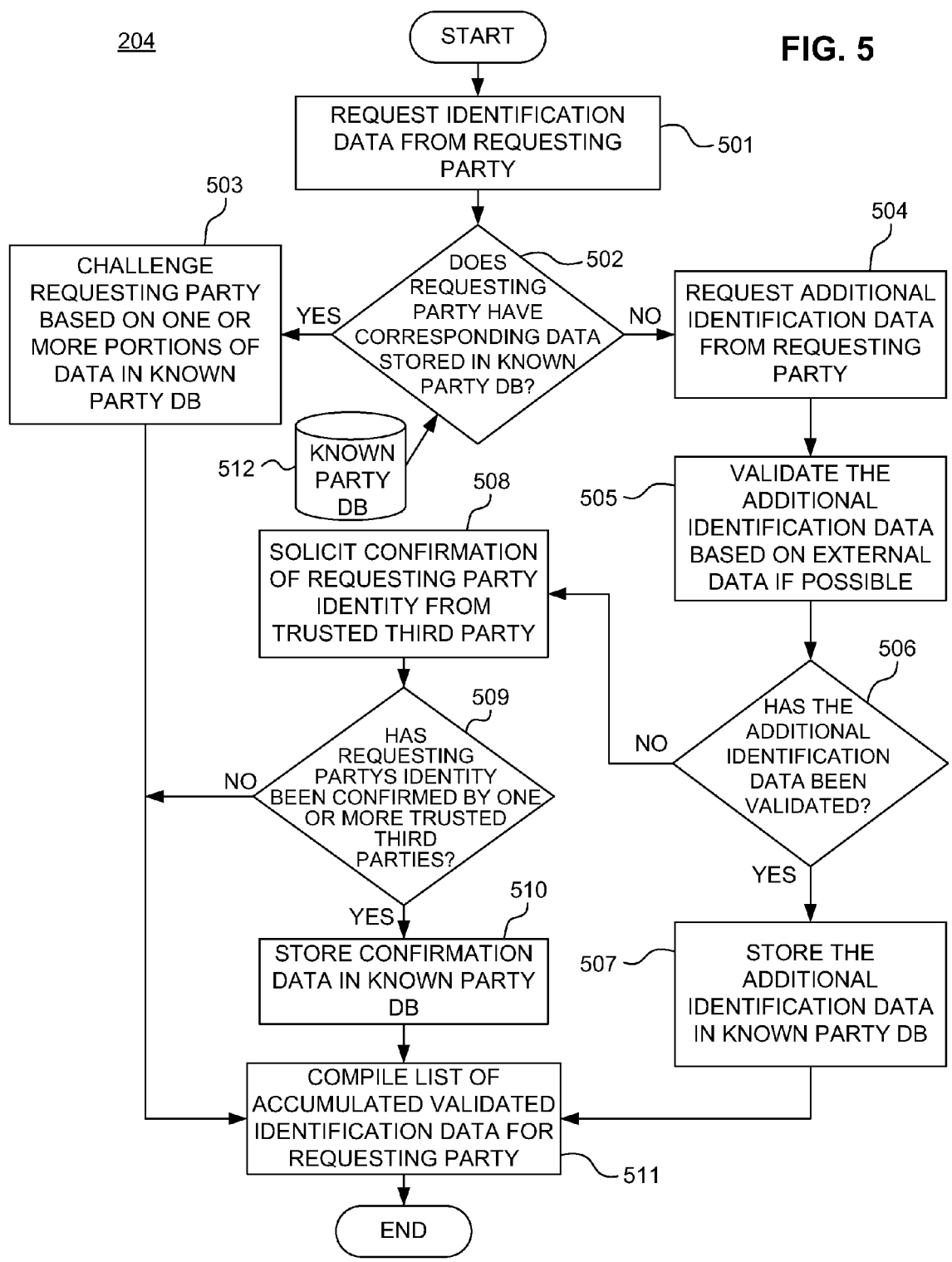
FIG. 5 is a flowchart illustrating an exemplary process for generating a list of identification data associated with a requesting party.

FIG. 5 is a flowchart illustrating an exemplary process 204 for generating a list of accumulated identification data associated with a requesting party. At block 501, trust mediator 116 requests initial identification data from the requesting party by sending a message to external terminal 102. The initial identification data can include, for example, (1) a first and last name of the requesting party, (2) a financial account number of the requesting party, (3) a social security number of the requesting party, (4) a unique account identifier of the requesting party, and the like. The requesting party inputs the requested initial identification data into external terminal 102 via a graphical user interface (GUI). In one embodiment, the GUI is part of a software application installed on the external terminal 102. In another embodiment, the requesting party communicates the requested initial identification data to trust mediator 116 via a message using the short message service (SMS).

In another embodiment, the initial identification data includes information represented by a two-dimensional code imprinted on a financial transaction instrument. The code may be a barcode, a quick response (QR) code, a proprietary code, or any other type of two-dimensional code. The code may represent information including, for example, a financial account number of the requesting party, an identifier of an issuer of the financial transaction instrument, an identifier such as a name, fingerprint, address, etc., of an owner of the financial transaction instrument, and/or the like. In some embodiments, each two-dimensional code represents a binary code, which, in turn, represents an alphanumerical character. The information represented by the code can be in unencrypted (e.g., plaintext) or encrypted (e.g., ciphertext) form.

Alternatively, or in addition, the financial transaction instrument is partitioned into two or more segments, with a two-dimensional code imprinted within each segment. Each code may represent an independent piece of information. Or each code may represent a portion of information, which is fully represented by a concatenation of codes across multiple segments (according to a predetermined sequence of segments).

In another aspect, for each financial transaction instrument, a subset of segments is randomly preselected to include codes that represent meaningful information, with the remaining segments including decoy codes, i.e., codes that do not represent any meaningful information.

In some embodiments, the code itself is hidden. That is, the code is undetectable by a human eye without the assistance of a device capable of detecting such a code. The hidden code is imprinted onto the financial transaction instrument as slight variations in a controllable parameter, such as color, text positioning offsets, text shape, and/or the like.

In yet another embodiment, a camera, a specialized sensor, or the like, which is communicatively coupled to the external terminal 102, is configured to detect the code and forward the code to the external terminal 102 for decoding. The external terminal 102 includes pattern recognition software that, when executed, decodes the code into decoded information. The external terminal 102 forwards the decoded information to other components of system 100 for further processing and/or validation.

At block 502 trust mediator 116 determines whether the requesting party is a known party. In particular, trust mediator 116 determines whether the requesting party has corresponding identification data stored in known party database 512 based on the initial identification data. Trust mediator 116 accomplishes this by searching known party database 512 for the initial identification data received at block 501.

If trust mediator 116 determines that the requesting party has corresponding identification data stored in known party database 512 (i.e., the requesting party is a known party) then, at block 503, trust mediator 116 presents, via external terminal 102, a challenge message to the requesting party based on one or more portions of the corresponding data stored in known party database 512. The challenge message requests that the requesting party submit a portion of the identification data stored in known party database 512. For example, the challenge message can include a query for (1) the maiden name of the mother of the requesting party, (2) a date of birth of the requesting party, (3) a password, (4) a personal identification number (PIN), and the like. Any identification data responses provided by the requesting party via external terminal 102 to trust mediator 116 are validated by comparing the responses to the portion of data stored in known party database 512 resulting in validated identification data. At block 511, trust mediator 116 adds the validated identification data to a cumulative list of validated identification data.

If trust mediator 116 determines that the requesting party has no corresponding data stored in known party database 512 (i.e., the requesting party is an unknown party) then, at block 504, trust mediator 116 requests, via external terminal 102, identification data from requesting party so that the identification data can be validated and stored in known party database 512. In this way the requesting party can become, from the perspective of system 100, a known party. The request for identification data can include requests for, in general, any data associated with the requesting party that trust mediator 116 can use to authenticate the identity of the requesting party. Example requests include requests for (1) a first and last name of the requesting party, (2) an financial account number of the requesting party, (3) social security number of the requesting party, (4) a unique account identifier of the requesting party, (5) a code (and/or corresponding underlying information) imprinted on a financial transaction instrument, as discussed above with respect to block 501, and/or the like.

At block 505, trust mediator 116 validates the identification data received at block 504 based on external data sources. External data sources include any data sources that are not maintained by internal network components 118. Examples of external data include (1) data from social networking websites, such as FACEBOOK and MYSPACE, (2) data from commercially available research databases such as LEXISNEXIS and WESTLAW, (3) data from other commercially available telephone directories, (4) data obtainable from Internet search engines such as GOOGLE, etc.

Trust mediator begins validation by executing one or more searches in one or more external data sources for the identification data that has been provided by the requesting party at block 504. Trust mediator 116 then computes a reliability score of the identification information provided by the requesting party at block 504 based on the results of the searches. For example, if the requesting party provides a first name, last name, and home address, and if searches of three separate external data sources corroborate the data, then there is a high reliability that the data is valid. In one embodiment, trust mediator 116 may require that the identification information provided by the requesting party at block 504 be corroborated by a predetermined minimum number of different external data sources to be validated.

In another embodiment, data retrieved from each specific external data source is assigned a reliability score. Trust mediator 116 computes a total reliability score as a summation of the reliability scores for corroborating identification data obtained from each the available external data sources. In this case, the data is validated if the total reliability score exceeds a predetermined threshold.

At block 506, trust mediator 116 determines whether the identification data provided by the requesting party at block 504 has been validated. If trust mediator 116 determines that the identification data provided by the requesting party at block 504 has been validated then, at block 507, trust mediator 116 stores the validated identification data in known party database 512.

If trust mediator 116 determines that the identification data provided by the requesting party at block 504 has not been validated then, at block 508, trust mediator 116 solicits confirmation or sponsorship of the identity of requesting party from a trusted third party associated with the requesting party, if any exists.

In one embodiment, trust mediator 116 solicits sponsorship of the identity of the requesting party by sending a request for third party identification information to the requesting party via external terminal 102. If the requesting party responds to the request, then trust mediator 116 matches the provided third party identification information to the known party database 512. Trust mediator 116 retrieves, from the known party database 512, a communication channel associated with the trusted third party and requests the sponsorship from the third party via the retrieved communication channel. For example, trust mediator 116 can send a message requesting sponsorship of the requesting party to (1) an external terminal 102 associated with the third party, (2) an e-mail address on record for the third party, (3) an inbox of the third party at a social networking website, etc.

In another embodiment, trust mediator 116 solicits sponsorship of the identity of the requesting party by requesting a social networking identifier of the requesting party associated with a particular social networking website. Trust mediator 116 then searches the social networking website for third parties linked to the requesting party. Trust mediator 116 compares the third parties to the known party database 512 and sends messages to the known third parties requesting sponsorship of the requesting party.

By utilizing external data sources and sponsorship from third parties, the identity of unknown parties requesting use of system 100 is corroborated using multiple channels. In this way, the trust of unknown parties is dynamically established by not only utilizing internal data sources for validation, but utilizing external data sources and third party relationships as well.

At block 509, trust mediator 116 determines whether the identity of the requesting party has been confirmed or sponsored by one or more trusted third parties. If trust mediator 116 determines that the identity of the requesting party has been confirmed by one or more trusted third parties then, at block 510, trust mediator 116 stores confirmation or sponsorship data including the identity of the sponsoring trusted third party (or parties) in known party database 512.

At block 511, trust mediator 116 generates a list of accumulated and validated identification data associated with the requesting party and stores it in a temporary memory location for use in computing a trust score of the requesting party.

E. Computing a Trust Score of Requesting Party

Figure 6:
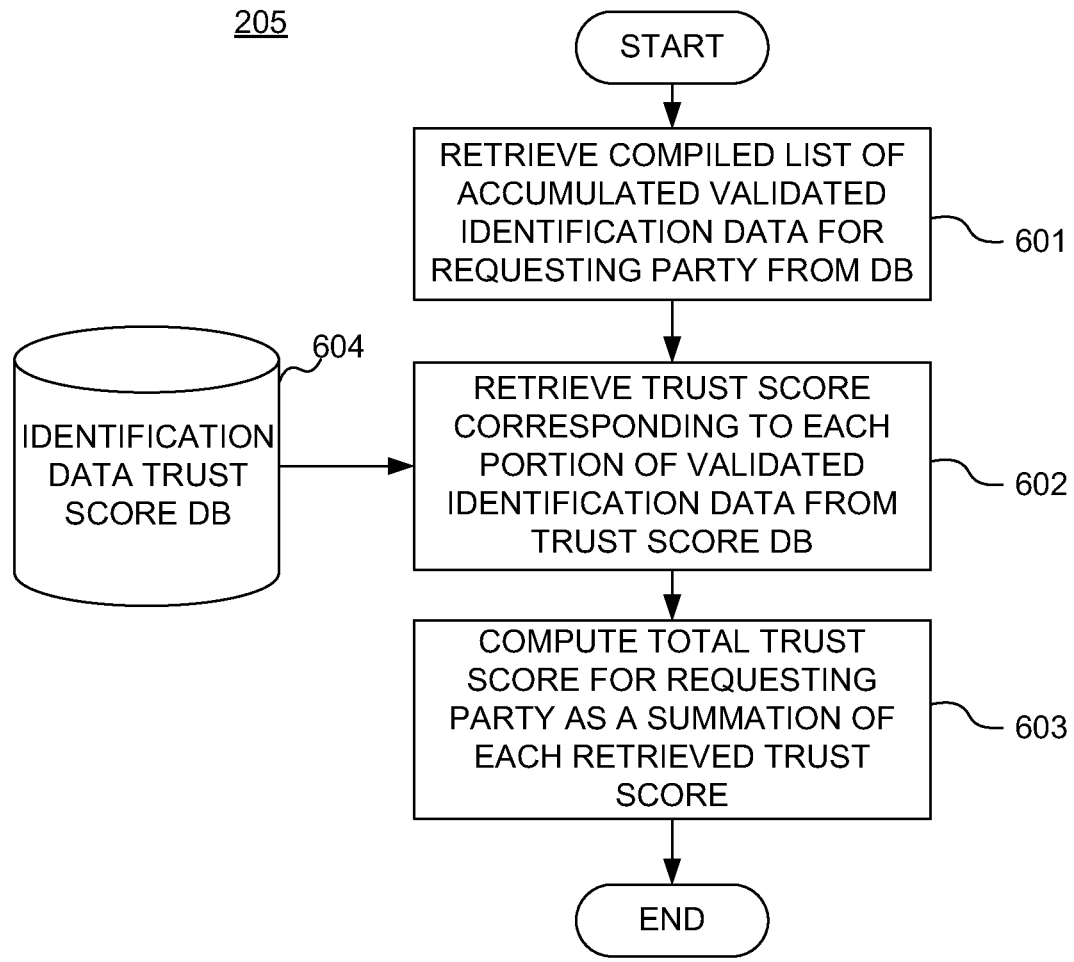
FIG. 6 is a flowchart illustrating an exemplary process for computing a trust score associated with a requesting party.

FIG. 6 is a flowchart illustrating an exemplary process 205 for computing a trust score of a requesting party. At block 601, trust mediator 116 retrieves the generated list of cumulative validated identification data associated with the requesting party from the temporary memory location. The generated list of cumulative validation data includes identification information of the requesting party, as well as any third party sponsorship data, if any.

At block 602, trust mediator 116 retrieves trust scores corresponding to each portion of the validated identification data and/or sponsorship data from identification data trust score database 604. Identification data trust score database 604 includes data indicating a trust score corresponding to each type of identification data, such as a last name and first name combination, a password, a PIN, a date of birth, a social security number, a mother's maiden name, data associated with the previous successful transaction, etc. For example, a password may have a corresponding trust score of 75 points, while a mother's maiden name has a corresponding trust score of 30 points.

In one embodiment, each confirmation or sponsorship of the requesting party by a trusted third party counts as a predetermined number of trust score points. For example, if each sponsorship counts as 10 points, and if the requesting party has achieved three sponsorships, then the requesting party has a cumulative trust score of 30 points (assuming the requesting party has no trust score points from other sources).

In another embodiment, each confirmation or sponsorship of the requesting party by a trusted third party counts as a number of trust score points proportional to the trust score associated with the trusted third party. For example, if the requesting party has achieved a sponsorship from a third party that has a trust score of 90 and a third party that has a trust score of 80 then the requesting party has a cumulative trust score of the sum of the trust scores of the sponsoring parties (90+80) multiplied by a predetermined multiplicative constant (e.g., 0.1). In this example, the requesting party has a cumulative trust score of 17.

At block 603, trust mediator 116 computes a total trust score for the requesting party as a summation of each trust score retrieved from identification data trust score database 604 that have a corresponding entry on the cumulative list of validated identification data generated at block 511 for the requesting party.

IV. Example Implementations

The present invention (e.g., system 100, processes 200 and 202-205, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 7:
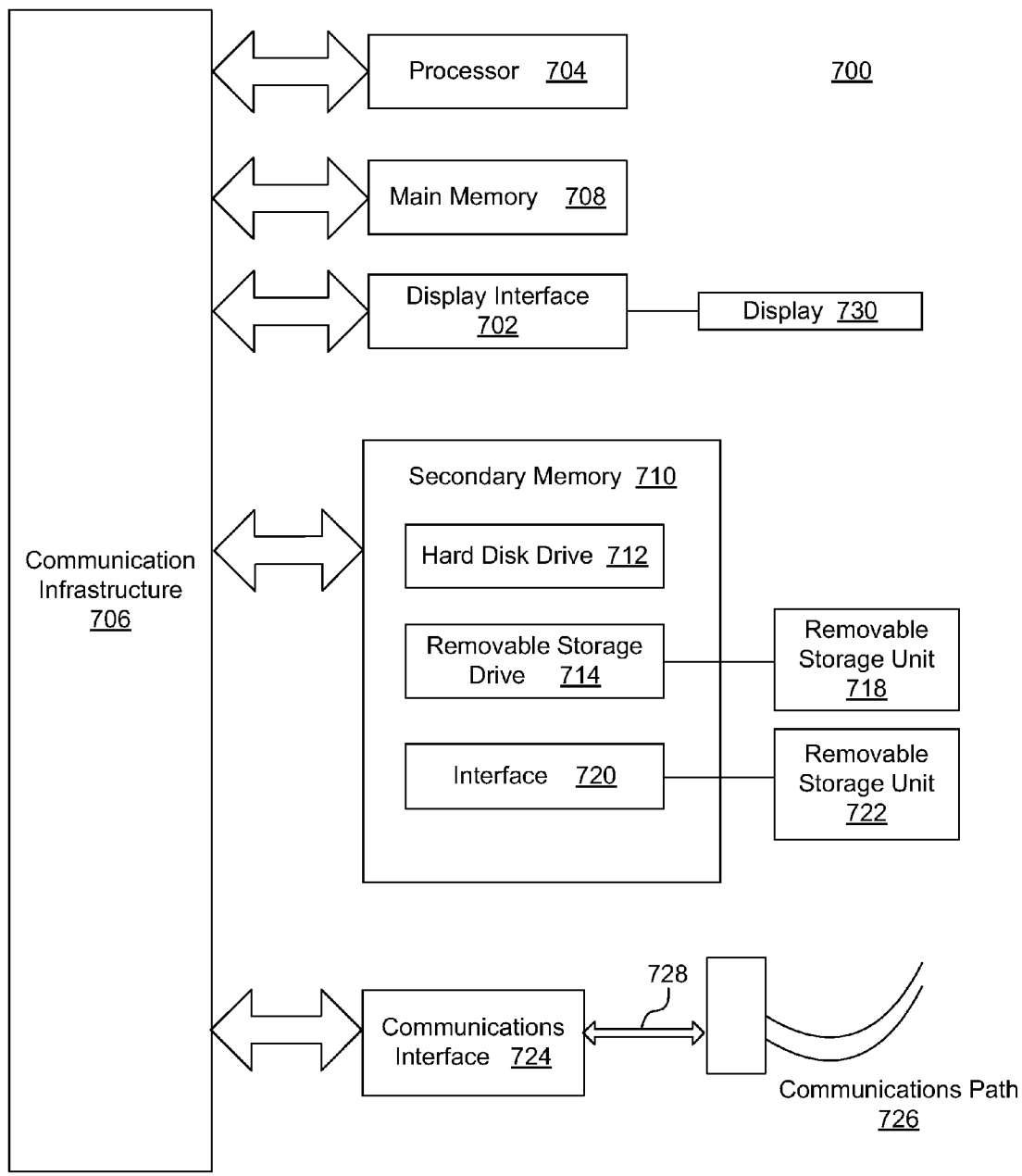
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7.

Computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 can include other similar devices for allowing computer programs or other instructions to be loaded into computer system 700. Such devices can include, for example, a removable storage unit 722 and an interface 720. Examples of such can include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a Personal Computer Memory Card International Association (PCMCIA) slot and card, etc. Software and data transferred via communications interface 724 are in the form of signals 728 which can be electronic, electromagnetic, optical or other signals capable of being received by communications interface 724. These signals 728 are provided to communications interface 724 via a communications path (e.g., channel) 726. This channel 726 carries signals 728 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 714, a hard disk installed in hard disk drive 712, and/or signals 728. These computer program products provide software to computer system 700. The invention is directed to such computer program products.

Computer programs (also referred to as computer control logic) are stored in main memory 708 and/or secondary memory 710. Computer programs can also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software can be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software, with automated and man-in-the-loop operations.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for securing a trusted communications channel for a mobile financial transaction, the method comprising:
    receiving, from a user via an external terminal, an access control entitlement request, wherein the request corresponds to a financial transaction;
    computing, by a processor included in a machine, a total risk level associated with the financial transaction;
    storing, in a database, a table that matches a plurality of total risk levels to a plurality of required trust scores, correspondingly, wherein, for a transaction having one of the plurality of total risk levels, the corresponding required trust score is required in order to be granted the access control entitlement;
    determining which of the plurality of required trust scores is required in order to be granted the access control entitlement by:
        matching, by the processor, the computed total risk level associated with the financial transaction to a corresponding one of the plurality of total risk levels stored in the database, and
        identifying, in the table, one required trust score of the plurality of required trust scores that corresponds to the corresponding one of the plurality of total risk levels obtained by the matching;
    receiving user identification data associated with the user from one or more data sources;
    validating, by the processor, the user identification data;
    computing, by the processor, a user trust score associated with the user based on the validated identification data;

comparing, by the processor, the user trust score to the one required trust score obtained by the identifying; and transmitting the access control entitlement, to the user via the external terminal, if the user trust score is greater than or equal to the one required trust score obtained by the identifying.

2. The method of claim 1, wherein computing a total risk level associated with the financial transaction further includes:

computing a value of the financial transaction;

retrieving security-related sensor data from trust mediator agents;

computing, based on the security-related sensor data, a probability that financial transaction data will be compromised; and computing a product of the value of the financial transaction and the probability that the financial transaction data will be compromised.

3. The method of claim 1, wherein receiving user identification data associated with the user further includes at least one of:

receiving user identification data from the user via the external terminal;

receiving user identification data from a third party via a third party external terminal; or retrieving user identification data from an external database.

4. The method of claim 1, wherein validating the user identification data further includes:

comparing the user identification data to data retrieved from at least one of (1) a known party database, (2) a third party external terminal, or (3) an external database.

5. The method of claim 1, wherein computing the user trust score further includes:

retrieving, from the database, an individual trust score corresponding to each portion of the validated user identification data, respectively; and computing the user trust score as a summation of each retrieved individual trust score.

6. A system for securing a trusted communications channel for a mobile financial transaction, the system comprising:

a machine including a processor coupled to a memory, the processor being operable to:

receive, from a user via an external terminal, an access control entitlement request, wherein the request corresponds to a financial transaction;

compute a total risk level associated with the financial transaction;

store, in a database, a table that matches and a plurality of total risk levels to a plurality of required trust scores, correspondingly, wherein, for a transaction having one of the plurality of total risk levels, the corresponding required trust score is required in order to be granted the access control entitlement;

determine which of the plurality of required trust scores is required in order to be granted the access control entitlement by:

matching the computed total risk level associated with the financial transaction to a corresponding one of the plurality of total risk levels stored in the database, and identifying, in the table, one required trust score of the plurality of required trust scores that corresponds to the corresponding one of the plurality of total risk levels obtained by the matching;

receive user identification data associated with the user from one or more data sources;

validate the user identification data;

compute a user trust score associated with the user based on the validated identification data;

compare the user trust score to the one required trust score obtained by the identifying; and transmit the access control entitlement, to the user via the external terminal, if the user trust score is greater than or equal to the one required trust score obtained by the identifying.

7. The system of claim 6, wherein the processor is further operable to:

compute a value of the financial transaction;

retrieve security-related sensor data from trust mediator agents;

compute, based on the security-related sensor data, a probability that financial transaction data will be compromised; and compute a product of the value of the financial transaction and the probability that the financial transaction data will be compromised.

8. The system of claim 6, wherein the processor is further operable to:

receive user identification data from the user via the external terminal;

receive user identification data from a third party via a third party external terminal; and retrieve user identification data from an external database.

9. The system of claim 6, wherein the processor is further operable to:

compare the user identification data to data retrieved from at least one of (1) a known party database, (2) a third party external terminal, or (3) an external database.

10. The system of claim 6, wherein the processor is further operable to:

retrieve, from the database, an individual trust score corresponding to each portion of the validated user identification data, respectively; and compute the user trust score as a summation of each retrieved individual trust score.

11. A non-transitory computer-readable medium having stored thereon sequences of instructions, the sequences of instructions including instructions, which, when executed by a computer system, cause the computer system to perform:

receiving, from a user via an external terminal, an access control entitlement request, wherein the request corresponds to a financial transaction;

computing a total risk level associated with the financial transaction;

storing, in a database, a table that matches a plurality of total risk levels to a plurality of required trust scores, correspondingly, wherein, for a transaction having one of the plurality of total risk levels, the corresponding required trust score is required in order to be granted the access control entitlement;

determining which of the plurality of required trust scores is required in order to be granted the access control entitlement by:

matching the computed total risk level associated with the financial transaction to a corresponding one of the plurality of total risk levels stored in the database, and identifying, in the table, one required trust score of the plurality of required trust scores that corresponds to the corresponding one of the plurality of total risk levels obtained by the matching;

receiving user identification data associated with the user from one or more data sources;

validating the user identification data;

computing a user trust score associated with the user based on the validated identification data;

comparing the user trust score to the one required trust score obtained by the identifying; and transmitting the access control entitlement, to the user via the external terminal, if the user trust score is greater than or equal to the one required trust score obtained by the identifying.

12. The non-transitory computer-readable medium of claim 11, wherein the sequences of instructions further include instructions, which, when executed by the computer system, cause the computer system to perform:

computing a value of the financial transaction;

retrieving security-related sensor data from trust mediator agents;

computing, based on the security-related sensor data, a probability that financial transaction data will be compromised; and computing a product of the value of the financial transaction and the probability that the financial transaction data will be compromised.

13. The non-transitory computer-readable medium of claim 11, wherein the sequences of instructions further include instructions, which, when executed by the computer system, cause the computer system to perform:

receiving user identification data from the user via the external terminal;

receiving user identification data from a third party via a third party external terminal; and retrieving user identification data from an external database.

14. The non-transitory computer-readable medium of claim 11, wherein the sequences of instructions further include instructions, which, when executed by the computer system, cause the computer system to perform:

comparing the user identification data to data retrieved from at least one of (1) a known party database, (2) a third party external terminal, or (3) an external database.

15. The non-transitory computer-readable medium of claim 11, wherein the sequences of instructions further include instructions, which, when executed by the computer system, cause the computer system to perform:

retrieving, from the database, an individual trust score corresponding to each portion of the validated user identification data, respectively; and computing the user trust score as a summation of each retrieved individual trust score.

* * * * *